US008982160B2

(12) United States Patent
Yee et al.

(10) Patent No.: US 8,982,160 B2
(45) Date of Patent: Mar. 17, 2015

(54) APPARATUS AND METHODS FOR DYNAMICALLY CORRELATING VIRTUAL KEYBOARD DIMENSIONS TO USER FINGER SIZE

(75) Inventors: Jadine N. Yee, San Diego, CA (US); Joel Bernarte, San Diego, CA (US); Janet L. Dobson, Linton (GB); Giridhar D. Mandyam, San Diego, CA (US); Joseph Huang, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 745 days.

(21) Appl. No.: 12/761,479

(22) Filed: Apr. 16, 2010

(65) Prior Publication Data

US 2011/0254865 A1    Oct. 20, 2011

(51) Int. Cl.
*G09G 5/00* (2006.01)
*G06F 3/01* (2006.01)
*G06F 3/0488* (2013.01)

(52) U.S. Cl.
CPC ............ *G06F 3/013* (2013.01); *G06F 3/04886* (2013.01); *G06F 2203/04805* (2013.01)
USPC .......................................... 345/661; 345/619

(58) Field of Classification Search
CPC ....... G06F 1/00; G06F 3/013; G06F 3/04886; G06F 2203/04085; G06F 2203/04805; G06T 1/00; G06T 7/00; H04N 1/00; G09G 5/00
See application file for complete search history.

(56) References Cited

U.S. PATENT DOCUMENTS

| 7,391,887 B2* | 6/2008 | Durnell ......................... 382/117 |
| 2005/0047629 A1* | 3/2005 | Farrell et al. .................. 382/117 |
| 2005/0237310 A1* | 10/2005 | Fabritius et al. ............... 345/173 |

(Continued)

FOREIGN PATENT DOCUMENTS

| JP | 08087380 | 4/1996 |
| JP | 2004118484 A | 4/2004 |

(Continued)

OTHER PUBLICATIONS

Dave M. Stampe, "Heuristic filtering and reliable calibration methods for video-based pupil-tracking systems", Behavior Research Methods, Instruments, & Computers, 1993, 25(2), 137-142.*

(Continued)

*Primary Examiner* — Kee M Tung
*Assistant Examiner* — Sing-Wai Wu
(74) *Attorney, Agent, or Firm* — Shirin Tefagh

(57) ABSTRACT

Embodiments provide a user interface for computing devices equipped with a touchscreen user interface/display and a digital camera that enhances a portion of a displayed image within a user's gaze. A user may calibrate their mobile device by touching a portion of the touchscreen with one or more fingers and following a moving image on the display with their eyes. The mobile device may track where a user is looking, and if the user is looking at the mobile device display, a portion of the display in the vicinity of the user's gaze may be enhanced in size. In an embodiment, if the user is looking at a virtual keyboard, key icons near the user's gaze may be increased in size commensurate with the user's finger tip size. In this manner, a user can accurately select individual keys in a virtual keyboard that fits within a mobile device display.

32 Claims, 9 Drawing Sheets

(56) References Cited

U.S. PATENT DOCUMENTS

| | | | |
|---|---|---|---|
| 2005/0243054 A1* | 11/2005 | Beymer et al. | 345/156 |
| 2006/0022955 A1* | 2/2006 | Kennedy | 345/173 |
| 2008/0238947 A1* | 10/2008 | Keahey et al. | 345/666 |
| 2009/0315827 A1* | 12/2009 | Elvesjo et al. | 345/157 |

FOREIGN PATENT DOCUMENTS

| | | |
|---|---|---|
| JP | 2009251658 A | 10/2009 |
| KR | 20070011387 A | 1/2007 |

OTHER PUBLICATIONS

Zhang Yun, Zhao Xin-Bo, Zhao Rong-Chun, Zhou Yuan and Zou Xiao-Chun, "EyeSecret: An Inexpensive but High Performance Auto-Calibration Eye Tracker", ETRA 2008, Savannah, Georgia, Mar. 26-28, 2008 @2008 ACM.*

Machine translated JP2009-251658; date of publication: Oct. 29, 2009.*

International Search Report and Written Opinion—PCT/US2011/032626, International Search Authority—European Patent Office—Aug. 22, 2011.

* cited by examiner under U.S. Pat. No. 8,982,160 B2

APPARATUS AND METHODS FOR DYNAMICALLY CORRELATING VIRTUAL KEYBOARD DIMENSIONS TO USER FINGER SIZE

FIELD OF THE INVENTION

This application relates generally to computing device user interfaces, and more particularly to user interfaces suitable for touchscreen equipped mobile devices.

BACKGROUND

Mobile computing devices equipped with touchscreen displays have enabled a new generation of personal electronic devices. Touchscreen displays provide both a graphical display and a flexible user interface, and thus enable devices to eliminate physical keys and buttons in favor of a larger display. Such mobile devices typically include graphical user interface systems which enable users to enter commands by touching icons presented on the display. A common form of user interface presents a virtual keyboard or keypad with a number of small key icons arranged in the manner of a traditional physical keyboard or keypad. While virtual keyboard user interfaces are intuitive and useful, the limited size of the touchscreen display in typical mobile devices requires the virtual keyboard key icons to be limited in size, making it difficult for users to accurately touch without mistyping.

SUMMARY

The various embodiments enable user interfaces suitable for use on computing devices with touchscreen displays that can compensate for the size of a user's fingers by locally increasing the size of a portion of the display image by tracking a user's gaze with a digital camera. In an embodiment, a mobile device includes a touchscreen display and a digital camera positioned so that it can image a user's face while the user is viewing the touchscreen display. By tracking the user's eyes in digital images, the mobile device may be configured to determine where the user is looking, and if the user's gaze is directed to a location on the touchscreen display, a portion of the displayed image in the vicinity of where the user is looking may be increased in size. When the displayed image includes a virtual keyboard or keypad, key icons in the vicinity of the user's gaze may be increased in size commensurate with the dimensions of the user's finger tip. In an embodiment, the mobile device may be calibrated to a user's finger size and eyes in a training routine. While the embodiments may be particularly useful for virtual keyboard user interface displays, the eye-tracking localized magnification functionality may also be useful for other applications, as well as other forms of computing devices, including those with large touchscreen displays.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The terms "computing device" and "mobile device" are used interchangeably herein to refer to any one or all of cellular telephones, personal data assistants (PDA's), palmtop computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, personal computers and similar personal electronic devices which include a programmable processor, a touchscreen user interface/display and a digital camera positioned on the device so that it can image a use's eyes when a user can see the display. While the various embodiments are particularly useful in mobile devices, such as cellular telephones, which have small displays, the embodiments may also be useful in any computing device that employs a touchscreen display. Therefore, references to "mobile device" in the following embodiment descriptions are for illustration purposes only, and are not intended to exclude other forms of computing devices that feature a touchscreen display or to limit the scope of the claims.

Figure 1:
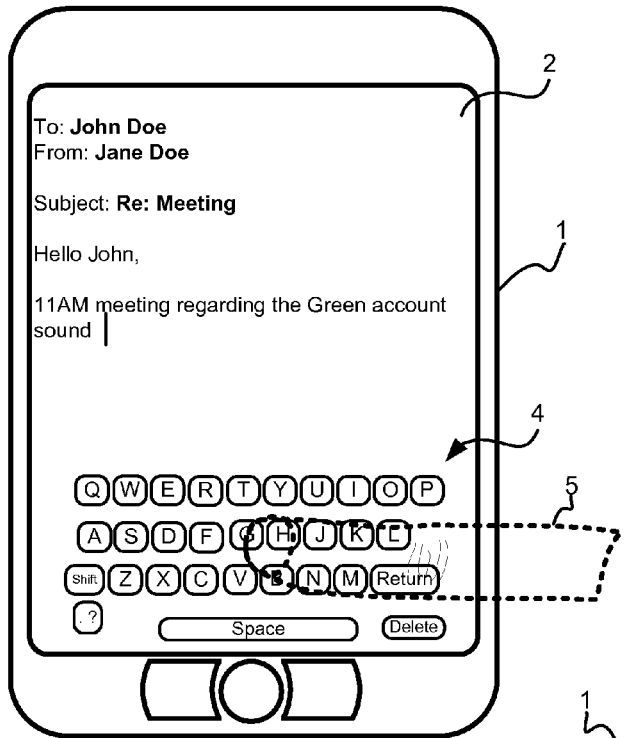
FIG. 1 is a frontal view of a mobile device showing a conventional user interface for a messaging application on a touchscreen display.

Computing devices equipped with a touchscreen user interface/display provide great flexibility in terms of user inputs and graphical representations of material. However, such user interfaces are not without their limitations. For example, when a conventional keyboard is represented in terms of a virtual keyboard or keypad on a typical mobile device touchscreen display, the key icons must be displayed in a size small enough to fit within the width and height of the display. Such small key icons can be very difficult to press accurately with a finger, as the surface area touched by a finger will typically encompass more than one key icon. This is illustrated in FIG. 1 which shows a mobile device 1 with a touchscreen 2 on which is displayed a virtual keyboard 4. In a typical virtual keyboard layout as illustrated in FIG. 1, a user's finger 5 attempting to press a single key (e.g., "H" key) will also touch surrounding key icons, such as the keys for "G," "H," "V" and "B" as illustrated. As a result, typing errors on such virtual keyboards and keypads are common and can frustrate users.

The various embodiments provide a solution for this problem with small mobile device displays by providing selective enhancement of the displayed image or icons in response to a user's gaze. In an embodiment, the user may calibrate their computing device to their own finger size and train the device to recognize the location of the user's gaze based on images taken of their eyes. By determining where the user is looking on the touchscreen and enhancing the portions of a virtual keyboard near where the user is looking in an amount based upon a finger size calibration factor, the mobile device can provide a user interface keyboard or keypad that fits within the real estate of the touchscreen display but provides key icons large enough for the user's fingers. In a further embodiment, the method of enhancing the portion of the display within the user's gaze can be applied to other applications, such as displayed maps, photographs, text, and other visual material. Also, the various embodiments may be implemented on any computing device including a touchscreen display, even those with large touchscreen displays, since the localized image enhancement functionality can enable users to accurate press particular locations on a display without having to magnify the entire image.

Figure 2:
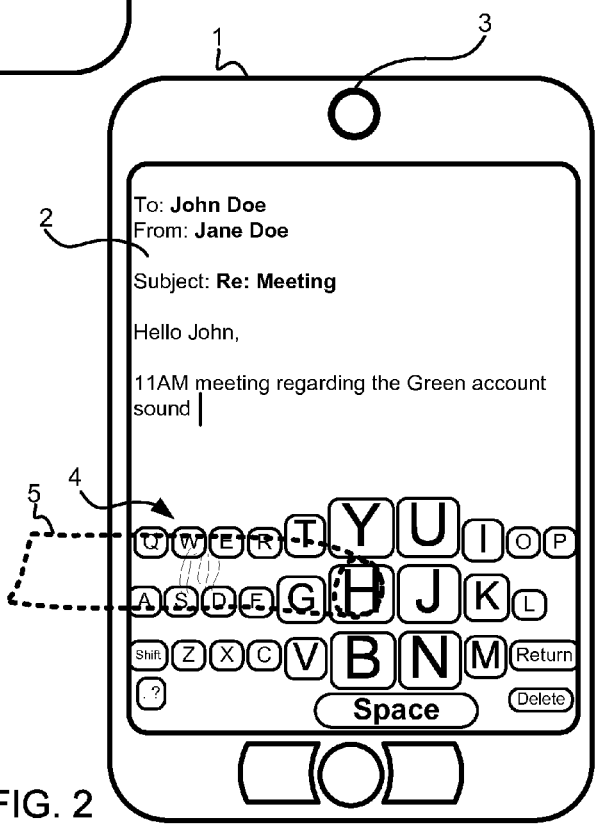
FIG. 2 is a frontal view of a mobile device showing an embodiment user interface for a messaging application.

FIG. 2 illustrates an embodiment operating on a mobile device 1 with a touchscreen 2. In this embodiment, the user's eyes are imaged by a digital camera 3 which is positioned on the mobile device 1 so that it can image the user's face while the user is interacting with the touchscreen 2. Based upon where the user is looking, the mobile device 1 increases the size of key icons in the virtual keypad virtual keyboard 4 so that they are compatible with the user's finger 5. As illustrated, a user attempting to press the virtual key for the letter "H" is presented with an icon that is as large as the user's finger tip. In this manner, the chance of pressing the wrong key or confusing the touchscreen interface with a touch event encompassing multiple key icons is reduced.

Figure 3:
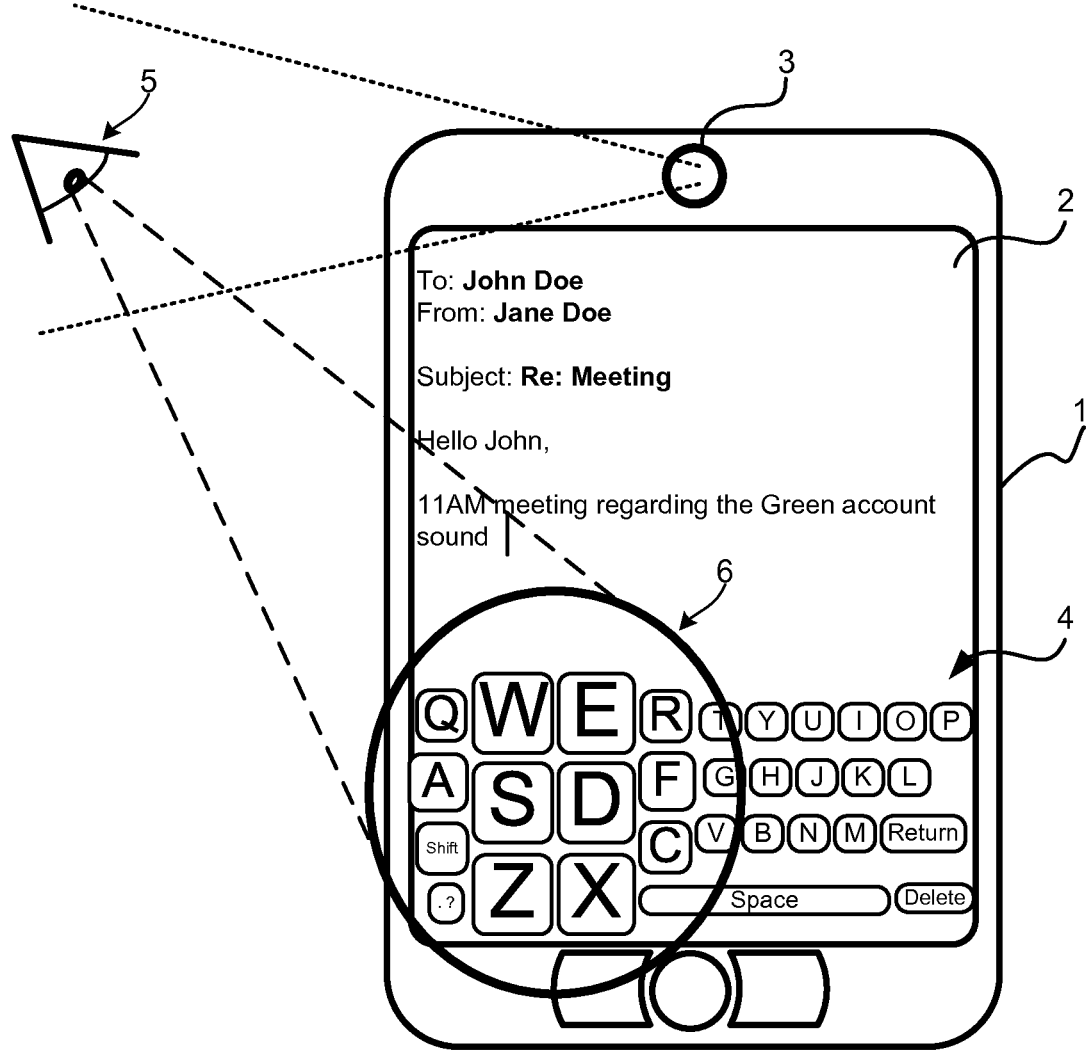
FIGS. 3 and 4 are frontal views of a mobile device illustrating operation of an embodiment user interface.
Figure 4:
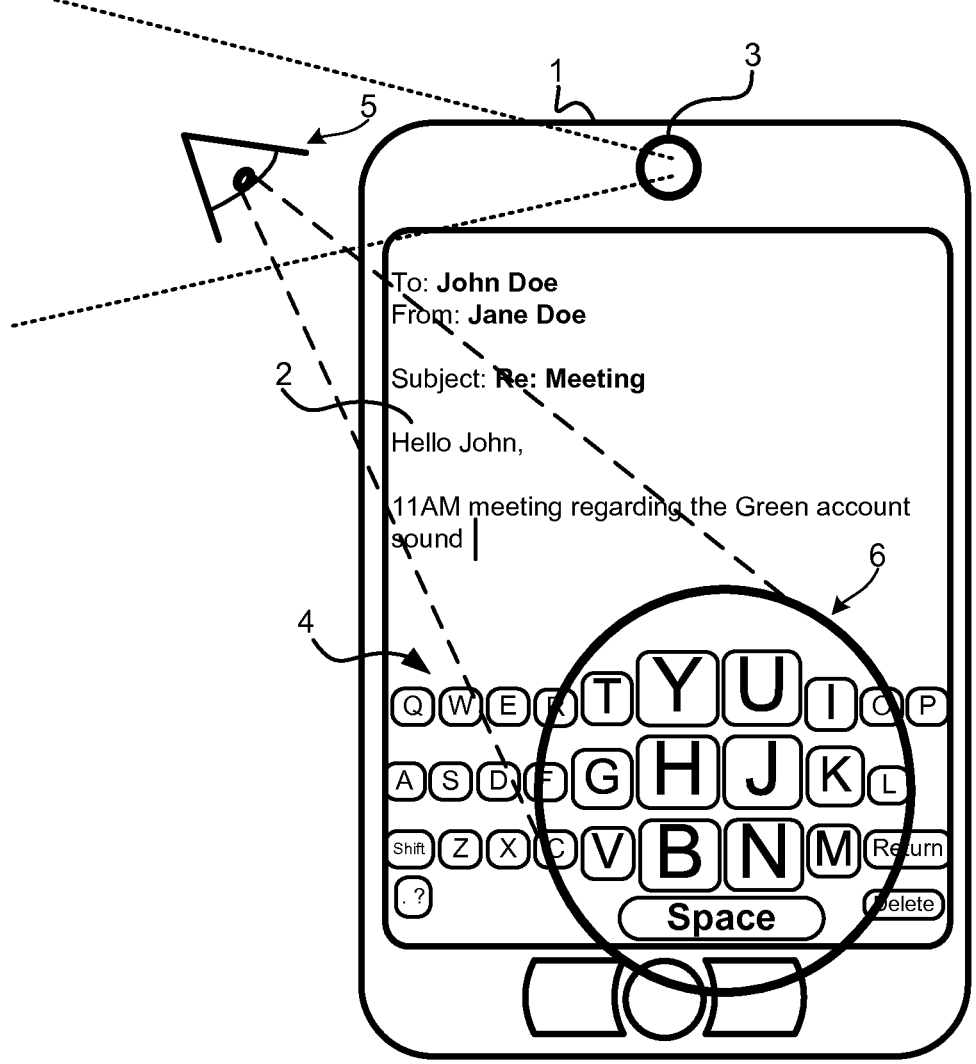

This embodiment is further illustrated in FIGS. 3 and 4 which show how the digital camera 3 images a user's eyes 5 to determine the location of user's gaze 6 on the touchscreen display 2. This may be accomplished by using image recognition software to locate the user's eyes and, more particularly, the location of the user's pupils. Determining the location of the user's gaze may be accomplished by applying image analysis rules to the image of the user's eyes which may take into account the orientation and position of the user's face with respect to the device touchscreen display as well as the location of the user's pupils within the image, and applying trigonometric calculations to estimate where the user is looking. As the mobile device determines the location of the user's gaze 6 from images obtained by the digital camera 3, the key icons of the virtual keypad 4 close to the center of the user's gaze 6 are enhanced in size. Thus, as the user's gaze 6 shifts from the left-hand side of the virtual keyboard 4, as shown in FIG. 3, to the right hand side, as shown in FIG. 4, those icons of the virtual keypad 4 within the center of the user's gaze 6 are made larger based on the calibration factor for the user's finger. FIGS. 3 and 4 illustrates how the embodiments enable a virtual keyboard 4 to fit within the limited space of a mobile device touchscreen 2 while also providing key icons large enough to accommodate a user's finger.

While FIGS. 2-4 show a virtual keyboard 4 that is enhanced in response to a user's gaze, the embodiments may also be applied to any virtual keypad, such as a telephone keypad, a calculator keypad or a game-specific keypad. Thus, the images of a virtual keyboard 4 are provided merely as examples and not as limitations on the scope of the embodiments.

Figure 5:
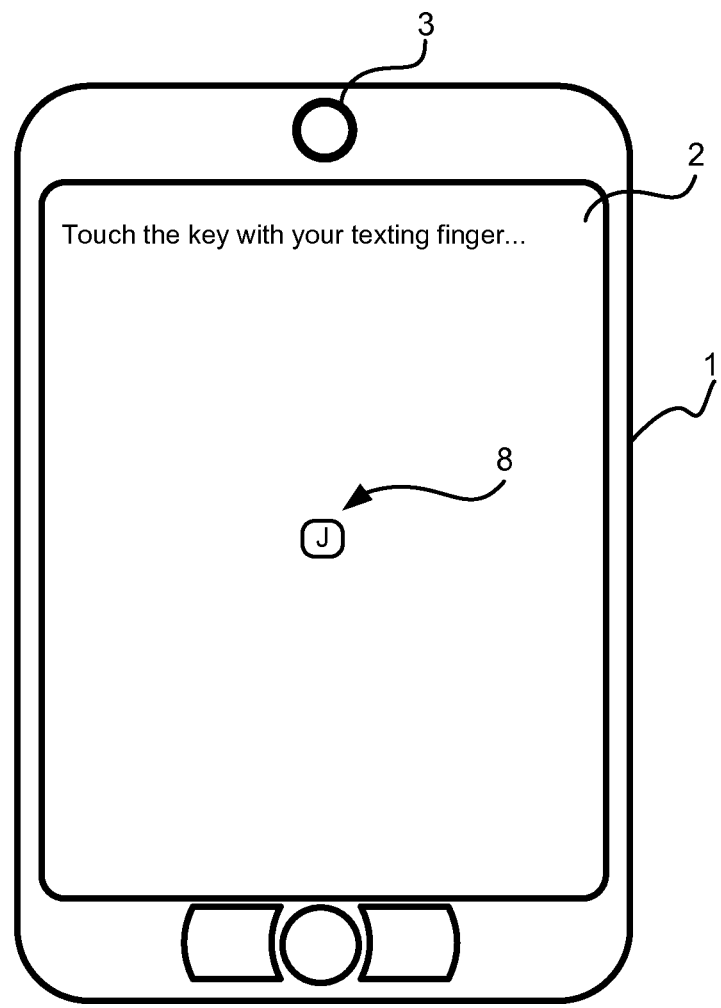
FIGS. 5 and 6 are frontal views of a mobile device illustrating a calibration operation of an embodiment user interface.

To calibrate the mobile device 1 to a user's finger size, the mobile device may require the user to initialize or calibrate their device to their fingers before usage. FIG. 5 shows an example user interface display that might be presented on a touchscreen 2 in a calibration process. In such a calibration process, a user may be prompted to touch a virtual key 8 on the screen with the finger or fingers normally used during texting. In this embodiment, the user merely has to touch the displayed key icon to enable the mobile device 1 to determine the dimensions of the surface area of the touchscreen 2 contacted by the user's finger tip. Using the measured dimensions, a device processor can calculate an appropriate user finger size calibration factor that may be stored in memory for use in resizing key icons as illustrated in FIGS. 2-4.

Figure 6:
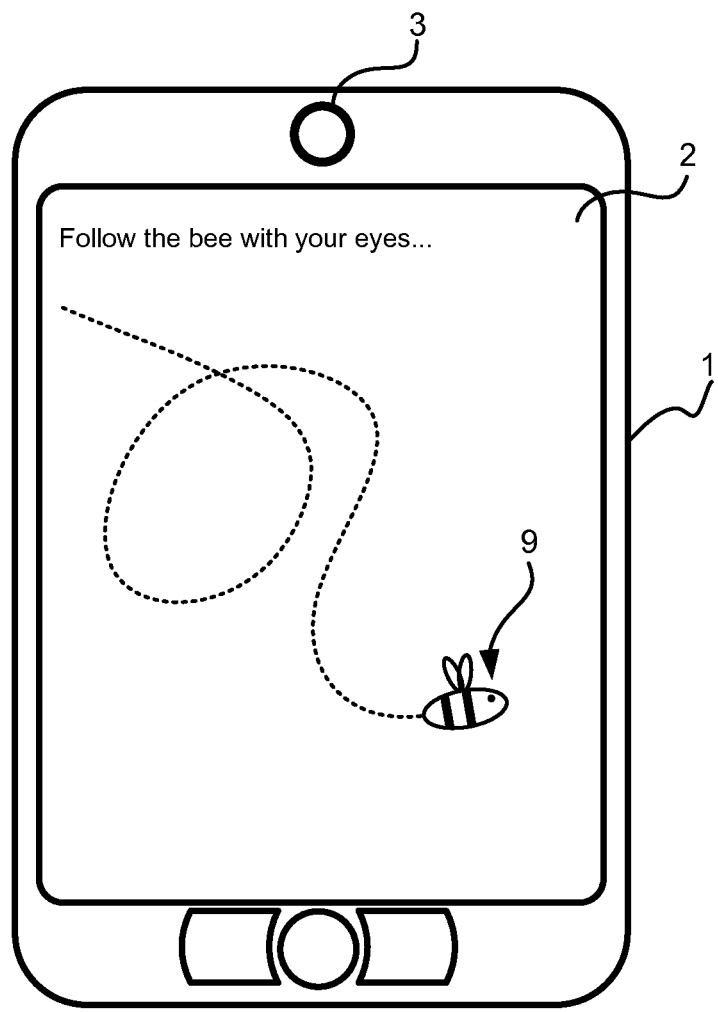

To calibrate the mobile device 1 to a user's eyes to enable it to accurately determine where a user is looking, the mobile device 1 may require the user to train their device to track their eyes in a training routine. FIG. 6 shows a simple user interface display that might be presented on a touchscreen 2 in such a training routine. For example, a user may be prompted to follow a moving icon on the touchscreen 2, such as an image of a bee 9 as it moves about on the touchscreen display 2. At each instant, the mobile device 1 compares the image of the user's eyes obtained from the digital camera 3 to the location of the moving icon 9 on the display 2 to learn how to correlate the image of the user's eyes to a particular location on the display 2. Since the device processor knows where the image is on the touchscreen, the processor can calculate a difference or correction factor, or otherwise adjust the image analysis rules to bring the determined location and the actual location into alignment. Such a calibration/learning process may be used to develop a set of rules for analyzing user facial images to determine a focus of gaze, such as by using well known machine learning techniques and well known image recognition techniques.

The calibration and training processes illustrated in FIGS. 5 and 6 may be repeated multiple times in order to provide a statistically averaged finger sized calibration and eye tracking rules. Further, the eye-tracking training may continue for a predetermined period of time or until the error between the actual location of the displayed image and the determined location at which the user is looking is reduced below a maximum threshold value.

Figure 7:
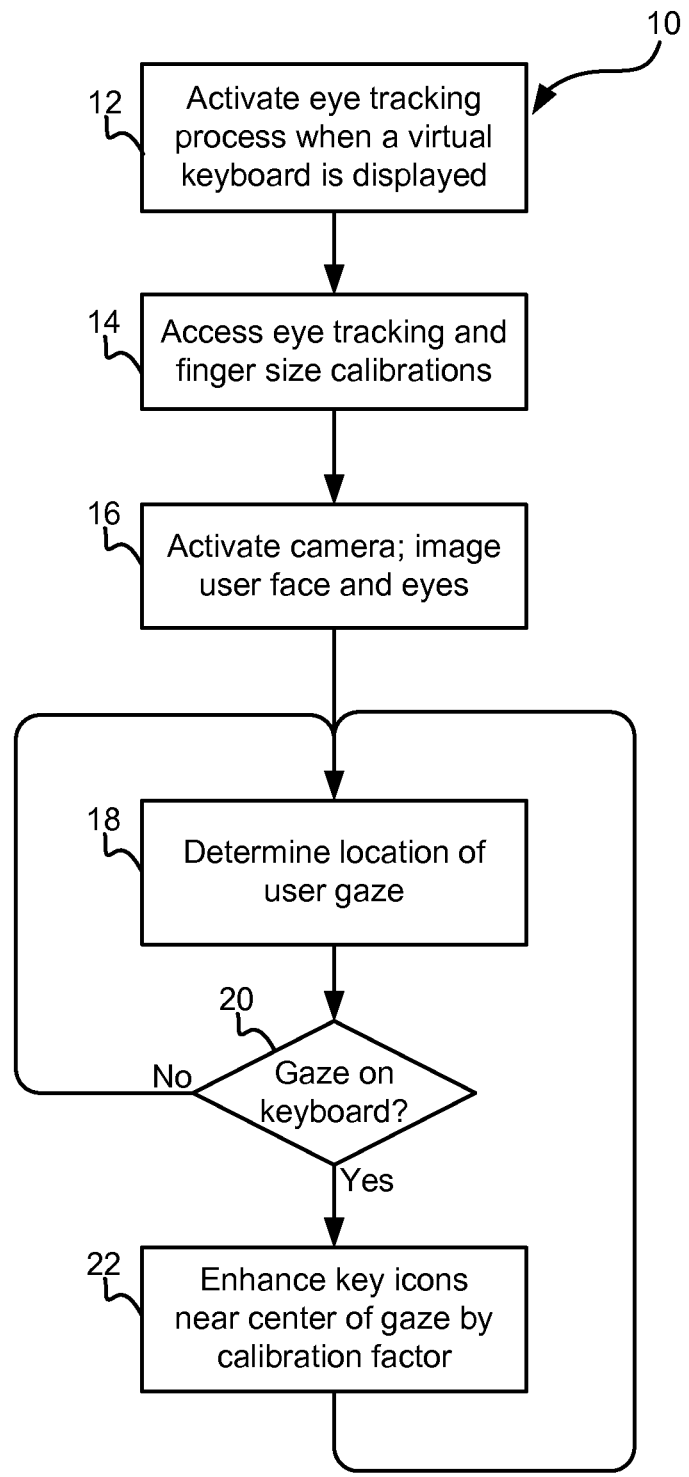
FIG. 7 is a process flow diagram of an example method for implementing an embodiment user interface.

An example method 10 that may be implemented on a computing device according to an embodiment is illustrated in FIG. 7. In method 10, the eye tracking/display enhancement functionality may be activated when a virtual keypad is displayed on a touchscreen, step 12. As part of activating the eye tracking/display enhancement functionality, a processor within the computing device may access calibration values and eye tracking rules from memory in step 14. In step 16, the processor may activate the digital camera 3 and begin imaging the user's face and eyes. In step 18, the processor may analyze an image of the user's face to determine the location of the user's gaze. As mentioned above, this may be accomplished by using image recognition software to locate the location and orientation of the user's pupils. Determining the location of the user's gaze may be accomplished by applying the image analysis rules obtained from memory to the image of the user's eyes. Such image analysis rules may be determined or adjusted during a user training routine as discussed below with reference to FIG. 8.

When the direction or location of the user's gaze is determined, the processor may compare that location to the location of the displayed virtual keypad to determine whether the user is looking at the keypad in determination step 20. If the processor determines that the user is not presently looking at the virtual keyboard (i.e., determination step 20="No"), the processor may continue to obtain and analyze images of the user's eyes from the digital camera by returning to step 18. If the processor determines that the user is presently looking at the virtual keyboard (i.e., determination step 20="Yes"), the processor may use the finger size calibration factor to enhance key icons near the center of the user's gaze in step 22. The processor then continues to receive and analyze images from the digital camera by returning step 18. This process may continue so long as the virtual keyboard is displayed on the touchscreen display or until the functionality is otherwise terminated by the user.

In addition to enlarging the size of virtual keys within the vicinity of where the user is looking, the processor may also adjust the display coordinates mapped to each key icon to match the size of the icons for purposes of recognizing a touch to the touchscreen display as a user input. Graphical user interface functions map the location of user interface icons (e.g., key icons) in the displayed image to coordinate locations or boundaries on the touchscreen interface so that the device processor can recognize when a particular icon is being touched by a user. Therefore, in step 22 the processor also may adjust the mapping of key icons to display coordinates to match the dimensions of the icons presented on the display. In an embodiment, the resizing of keyboard icons may be accomplished in two steps. First, the processor may determine the new size for each key icon based upon the location of the user's gaze and a finger calibration factor. Then, in a second step, the processor may adjust the mapping of icons to touchscreen sensor coordinates to match the adjusted dimensions of the various key icons.

Figure 8:
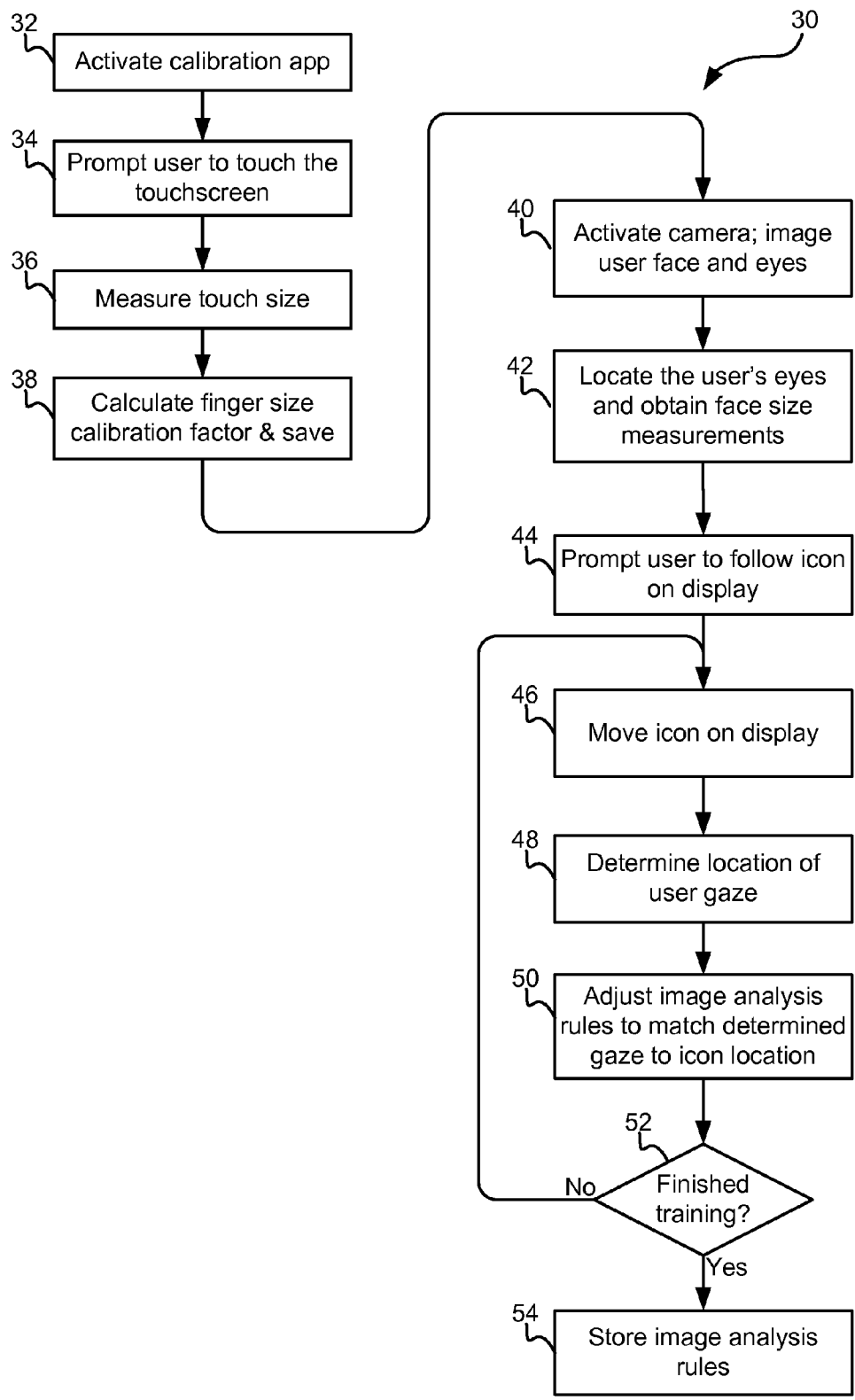
FIG. 8 is a process flow diagram of an embodiment method for calibrating an embodiment user interface.

FIG. 8 illustrates an example method 30 which may be implemented on a computing device for training and calibrating the device to a user's finger size and eye gaze. While method 30 illustrates both calibration/training operations together, the finger size calibration and the eye-tracking training may also be accomplished separately. In method 30 in step 32, a processor within the computing device may activate the calibration/training application, such as in response to a user menu selection or as part of a larger device initialization routine. In step 34, the processor may generate a display prompting the user to touch a particular spot on the touchscreen, such as illustrated in FIG. 5. In step 36, the processor may receive signals or coordinate information from the touchscreen display and measure the size and shape of the area contacted by the user's finger. In step 38, the processor may use the measured size and shape of the contact area to calculate a finger size calibration factor that can be stored in memory. This calibration factor may be a dimensional value (e.g., an area, diameter or radius) or a magnification factor (e.g., a percentage or numerical value) that may be applied to an icon's dimensions in order to determine an icon size that is suitable for the user's fingers.

In step 40, the processor may activate the digital camera and image the user's face and eyes. In step 42, the processor may analyze an obtained image to locate the user's face within the image, recognize the user's eyes and obtain dimensional measurements of the user's face within the image area. This information may be used to generate or adjust image recognition rules that can recognize and track the user's eyes when the computing device is held at various distances from the user's face. The distance between the computing device and a user's face will likely vary each time the functionality is activated and while the user is interacting with the computing device. Thus, part of the calibration may involve obtaining measurements to enable the computing device processor to compensate for different imaging distances. Further, the training process may be repeated at different face-to-camera distances to enable the processor to generate recognition rules that can compensate for differences in such separation distances.

In step 44, the processor may display a message prompting the user to follow a moving cartoon or icon on the display. In step 46 the processor may move the cartoon or icon an incremental distance on the display, and in step 48, the processor may obtain and analyze an image of the user's face to determine the location of the user's gaze. The cartoon or icon may be moved in step 46 continuously, incrementally, or in large steps (e.g., to each of the corners and center sequentially). The first time that the eye-tracking training is accomplished, the gaze determination operation in step 48 may employ default rules for translating images of the user's eyes to a gaze location on the computing device. In step 50, the computing device may adjust the gaze determination image analysis rules so the determined location matches the actual cartoon or icon location on the display. This eye-tracking rules calibration process may involve a simple linear adjustment or transformation of the rules used in step 48 to determine the user gaze location so that the determined location matches the actual location of the cartoon or icon on the display. In determination step 52, the processor may determine whether the training process is finished. The processor may continue the training routine by moving the cartoon or icon on the display for a predetermined amount of time, through a predetermined number of locations, or until the difference between the determined location of the gaze and the actual location of the cartoon or icon is consistently within a maximum threshold value (i.e., an acceptable error). So long as the processor determines that the training is not finished (i.e., determination step 52="No"), the processor may continue moving the cartoon or icon on the display, step 46, determining the location of the user's gaze, step 48, and calibrating the gaze-to-icon determination rules, step 50. Once the processor determines that the training is finished (i.e., determination step 52="Yes"), the processor may store the calibration settings and eye tracking image analysis rules in memory, step 54.

The various embodiments may also be applied to other types of applications which present visual displays that may benefit from preferential visual enhancement. For example, the eye-tracking localized magnification functionality may be useful in map or navigation programs so that users can see local map details within the context of a larger map display. Similar to a virtual keypad, a map or navigation application which permits a user to select a particular location for further information by touching a touchscreen interface may locally magnify the map in an amount that depends upon a finger size calibration factor. In this manner, a map or navigation application can receive user inputs via a finger touch to a particular location with reduced chance that the size of the user's finger tip will inadvertently select a wrong location.

Another practical application of the various embodiments would be to use the eye-tracking localized magnification functionality to enhance hyperlinks, Internet web links, and other "clickable" text displayed on a touchscreen display. Due to the small size of touchscreen displays on most mobile devices, the size of displayed web page icons and text is typically smaller than the finger tip of most users. Thus, touching the display screen to "click on" hyperlinks in the form of icons or hypertext can be difficult. The various embodiments can locally magnify web pages and documents containing hyperlinks where the user is looking so that the hyperlink icon or text is large enough to enable the user to accurately touch a desired hyperlink without inadvertently touching an incorrect hyperlink.

Figure 9:
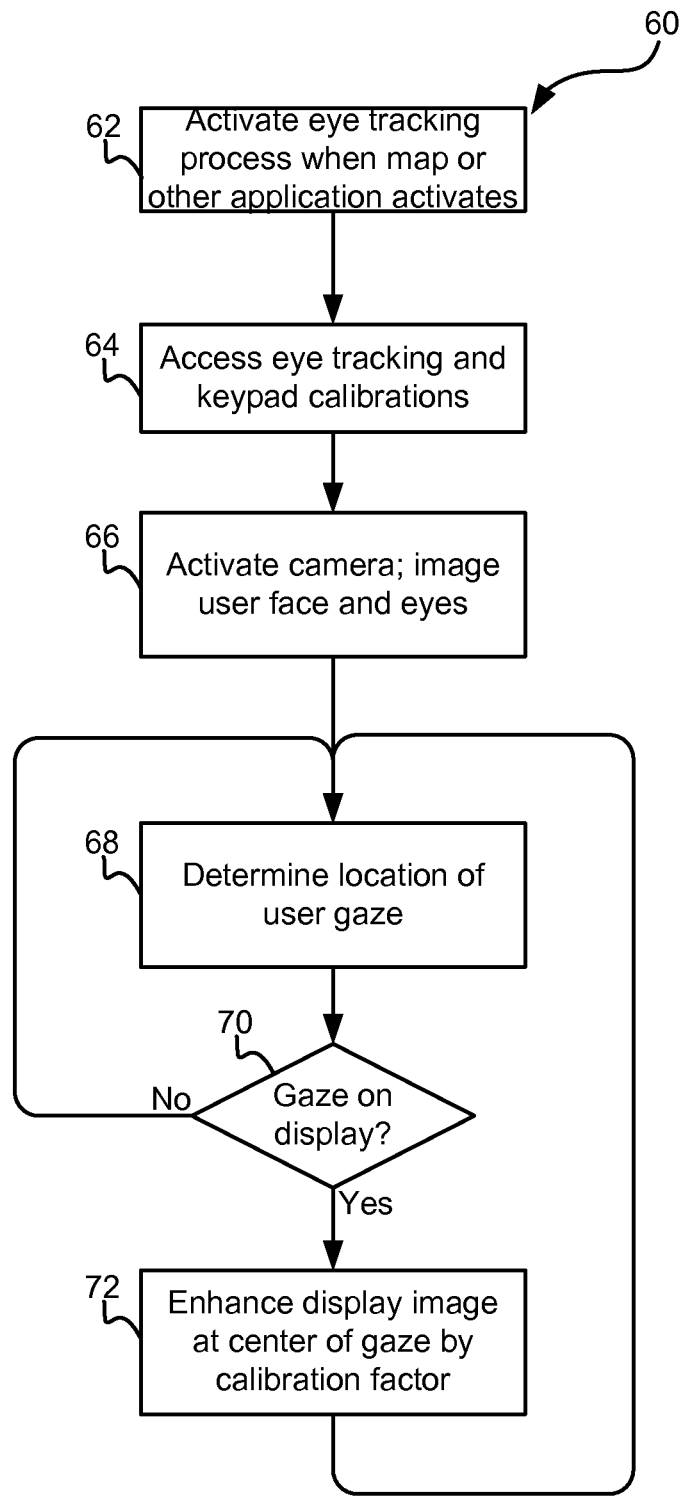
FIG. 9 is a process flow diagram of an embodiment method for implementing another embodiment user interface.

FIG. 9 illustrates an example method 60 for implementing such functionality on a computing device. In step 62, a computing device processor may activate the visual tracking and enhancement functionality in response to the activation of a map or other application. As part of activating the eye tracking/display enhancement functionality, a processor with in the computing device may access in memory calibration values and eye tracking rules, step 64. In step 66, the processor may activate the digital camera and begin imaging the user's face and eyes. In step 68, the processor may analyze an image of the user's face to determine the location of the user's gaze. To accomplish this analysis, the processor may apply image analysis rules determined during a user training routine as discussed above with reference to FIG. 8. When the location of the user's gaze is determined, the processor may compare that location to the location of the touchscreen display to determine whether the user is looking at the computing device display in determination step 70. If the processor determines that the user is not presently looking at the display (i.e., determination step 70="No"), the processor may continue to obtain and analyze images from the digital camera by returning to step 68. If the processor determines that the user is presently looking at the display (i.e., determination step 70="Yes"), the processor may enhance a portion of the keyboard image near the center of the user's gaze in step 72. The processor then continues to obtain and analyze images from the digital camera by returning step 68. This process may continue so long as the particular application is activated or a particular type of image is displayed on the touchscreen display, or until the functionality is terminated by a user.

Figure 10:
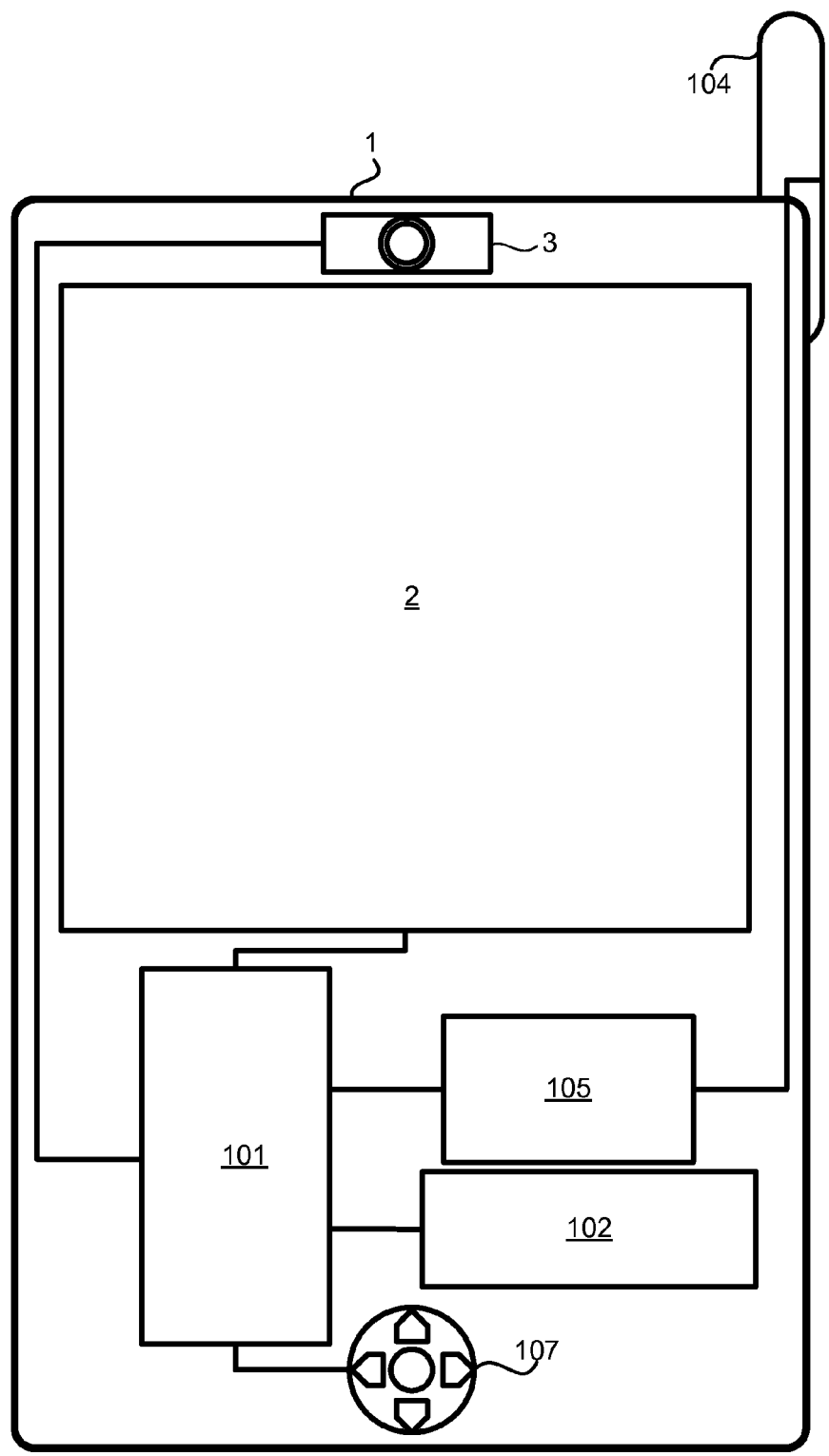
FIG. 10 is a component block diagram of a mobile device suitable for use in an embodiment.

Typical mobile devices 1 suitable for use with the various embodiments will have in common the components illustrated in FIG. 10. For example, a mobile receiver device 1 may include a processor 101 coupled to internal memory 102, a touchscreen display 2, and a digital camera 3 positioned so that it can image a user's eyes while the user is looking at the display 2. Additionally, the mobile device 1 may have an antenna 104 for sending and receiving electromagnetic radiation that is connected to a wireless data link and/or cellular telephone transceiver 105 coupled to the processor 101. Mobile devices typically also include menu selection buttons or rocker switches 107 for receiving user inputs. While FIG. 10 illustrates a mobile computing device, other forms of computing devices, including personal computers and laptop computers, will typically also include a processor 101 coupled to internal memory 102, a touchscreen display 2, and a digital camera 3 positioned so that it can image a user's eyes while the user is looking at the display 2. Further, the digital camera 3 may be built into the computing device as shown in FIG. 10 or configured as a separate device electronically coupled to the processor 101, such as by means of a cable (not shown) or wireless data link (not shown). Thus, FIG. 10 is not intended to limit the scope of the claims to a mobile computing device in the particular illustrated form factor.

The processor 101 may be any programmable microprocessor, microcomputer or multiple processor chip or chips that can be configured by software instructions (applications) to perform a variety of functions, including the functions of the various embodiments described herein. In some mobile devices, multiple processors 101 may be provided, such as one processor dedicated to wireless communication functions and one processor dedicated to running other applications. Typically, software applications may be stored in the internal memory 102 before they are accessed and loaded into the processor 101. In some mobile devices, the processor 101 may include internal memory sufficient to store the application software instructions. In some mobile devices, the secure memory may be in a separate memory chip coupled to the processor 101. In many mobile devices 1 the internal memory 102 may be a volatile or nonvolatile memory, such as flash memory, or a mixture of both. For the purposes of this description, a general reference to memory refers to all memory accessible by the processor 101, including internal memory 102, removable memory plugged into the mobile device, and memory within the processor 101 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary embodiments, the functions described may be implemented in hardware, software, firmware, or any combination thereof. If implemented in software, the functions may be stored as one or more instructions or code on a non-transitory computer-readable medium. The steps of a method or algorithm disclosed herein may be embodied in a processor-executable software module executed which may reside on a transitory processor-readable medium or computer-readable medium. Non-transitory computer readable media includes computer storage media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for providing a user interface on a computing device equipped with a touchscreen display and a digital camera configured to be able to image the face of a user when the user is viewing the touchscreen display, comprising:
    displaying a moving icon on the touchscreen display for a predetermined eye-tracking training period;
    obtaining a first plurality of images of the eyes of the user with the digital camera during the predetermined eye-tracking training period and when the face of the user is at a first distance from the digital camera;
    obtaining a second plurality of images of the eyes of the user with the digital camera when the face of the user is at a second distance from the digital camera;
    comparing the obtained first plurality of images to known locations of the moving icon during the predetermined eye-tracking training period to determine an image analysis rule;
    comparing the obtained second plurality of images to known locations of the moving icon to adjust the image analysis rule;
    storing the adjusted image analysis rule in memory;
    obtaining a digital image of the eyes of the user of the computing device with the digital camera after the predetermined eye-tracking training period;
    determining a location of a gaze of the user based on the obtained digital image and the adjusted image analysis rule;
    determining whether the gaze of the user is directed to a portion of the touchscreen display containing an image element without requiring additional user interaction with the user interface;
    determining a center of the portion of the touchscreen display to which the gaze of the user is directed; and
    enlarging the image element on the touchscreen display based upon a finger size calibration factor related to a size of a finger of the user and a distance from the center of the portion of the touchscreen display to which the gaze of the user is directed in response to determining that the gaze of the user is directed to the portion of the touchscreen display containing the image element.

2. The method of claim 1, further comprising enlarging a user interface icon when the user interface icon is near the determined location of the gaze of the user on the touchscreen display.

3. The method of claim 2, further comprising adjusting a mapping of displayed icons to coordinates of the touchscreen display to match the enlarged user interface icon.

4. The method of claim 1, wherein:
    determining whether the gaze of the user is directed to the portion of the touchscreen display containing the image element comprises determining whether the gaze of the user is directed to a virtual keyboard image on the touchscreen display; and
    enlarging the image element on the touchscreen display based upon the finger size calibration factor related to the size of the finger of the user and the distance from the center of the portion of the touchscreen display to which the gaze of the user is directed comprises:
        enlarging key icons within the virtual keyboard image located near where the user is looking based upon the finger size calibration factor; and
        adjusting a mapping of displayed key icons to coordinates of the touchscreen display to match the enlarged key icons.

5. The method of claim 1, further comprising:
    measuring a dimension of a touch area on the touchscreen display;
    calculating the finger size calibration factor based upon the measured dimension of the touch area; and
    storing the calculated finger size calibration factor in the memory.

6. The method of claim 1, wherein:
    determining whether the gaze of the user is directed to the portion of the touchscreen display containing the image element comprises determining whether the gaze of the user is directed to a vicinity of displayed hyperlinks; and
    enlarging the image element on the touchscreen display based upon the finger size calibration factor related to the size of the finger of the user and the distance from the center of the portion of the touchscreen display to which the gaze of the user is directed comprises:
        enlarging the displayed hyperlinks located near where the user is looking based upon the finger size calibration factor; and
        adjusting a mapping of the displayed hyperlinks to coordinates of the touchscreen display to match the enlarged displayed hyperlinks.

7. The method of claim 1, wherein the computing device is a mobile device.

8. The method of claim 1, wherein the computing device is a personal computer.

9. A computing device, comprising:
    a processor;
    a memory coupled to the processor;
    a digital camera coupled to the processor and configured to be able to image the eyes of a user of the computing device; and
    a touchscreen display coupled to the processor,
    wherein the processor is configured with processor-executable instructions to perform operations comprising:
        displaying a moving icon on the touchscreen display for a predetermined eye-tracking training period;
        obtaining a first plurality of images of the eyes of the user with the digital camera during the predetermined eye-tracking training period and when the face of the user is at a first distance from the digital camera;
        obtaining a second plurality of images of the eyes of the user with the digital camera when the face of the user is at a second distance from the digital camera;

comparing the obtained first plurality of images to known locations of the moving icon during the predetermined eye-tracking training period to determine an image analysis rule;

comparing the obtained second plurality of images to known locations of the moving icon to adjust the image analysis rule;

storing the adjusted image analysis rule in the memory;

obtaining a digital image of the eyes of the user of the computing device with the digital camera after the predetermined eye-tracking training period;

determining a location of a gaze of the user based on the obtained digital image and the adjusted image analysis rule;

determining whether the gaze of the user is directed to a portion of the touchscreen display containing an image element without requiring additional user interaction with a user interface;

determining a center of the portion of the touchscreen display to which the gaze of the user is directed; and enlarging the image element on the touchscreen display based upon a finger size calibration factor related to a size of a finger of the user and a distance from the center of the portion of the touchscreen display to which the gaze of the user is directed in response to determining that the gaze of the user is directed to the portion of the touchscreen display containing the image element.

10. The computing device of claim 9, wherein the processor is configured with processor-executable instructions to perform operations further comprising enlarging a user interface icon when the user interface icon is near the determined location of the gaze of the user on the touchscreen display.

11. The computing device of claim 10, wherein the processor is configured with processor-executable instructions to perform operations further comprising adjusting a mapping of displayed icons to coordinates of the touchscreen display to match the enlarged user interface icon.

12. The computing device of claim 9, wherein the processor is configured with processor-executable instructions to perform operations such that:

determining whether the gaze of the user is directed to the portion of the touchscreen display containing the image element comprises determining whether the gaze of the user is directed to a virtual keyboard image on the touchscreen display; and enlarging the image element on the touchscreen display based upon the finger size calibration factor related to the size of a finger of the user and the distance from the center of the portion of the touchscreen display to which the gaze of the user is directed comprises:

enlarging key icons within the virtual keyboard image located near where the user is looking based upon the finger size calibration factor; and adjusting a mapping of displayed key icons to coordinates of the touchscreen display to match the enlarged key icons.

13. The computing device of claim 9, wherein the processor is configured with processor-executable instructions to perform operations further comprising:

measuring a dimension of a touch area on the touchscreen display;

calculating the finger size calibration factor based upon the measured dimension of the touch area; and storing the calculated finger size calibration factor in the memory.

14. The computing device of claim 9, wherein the processor is configured with processor-executable instructions to perform operations such that:

determining whether the gaze of the user is directed to the portion of the touchscreen display containing the image element comprises determining whether the gaze of the user is directed to a vicinity of displayed hyperlinks; and enlarging the image element on the touchscreen display based upon a finger size calibration factor related to the size of the finger of the user and the distance from the center of the portion of the touchscreen display to which the gaze of the user is directed comprises:

enlarging the displayed hyperlinks located near where the user is looking based upon the finger size calibration factor; and adjusting a mapping of the displayed hyperlinks to coordinates of the touchscreen display to match the enlarged displayed hyperlinks.

15. The computing device of claim 9, wherein the computing device is a mobile device.

16. The computing device of claim 9, wherein the computing device is a personal computer.

17. A computing device, comprising:

means for displaying a moving icon on a touchscreen display for a predetermined eye-tracking training period;

means for obtaining a first plurality of images of eyes of a user with a digital camera during the predetermined eye-tracking training period and when the face of the user is at a first distance from the digital camera;

means for obtaining a second plurality of images of the eyes of the user when the face of the user is at a second distance from the digital camera;

means for comparing the obtained first plurality of images to known locations of the moving icon during the predetermined eye-tracking training period to determine an image analysis rule;

means for comparing the obtained second plurality of images to known locations of the moving icon to adjust the image analysis rule;

means for storing the adjusted image analysis rule in memory;

means for obtaining a digital image of the eyes of the user of the computing device after the predetermined eye-tracking training period;

means for determining a location of a gaze of the user based on the obtained digital image and the adjusted image analysis rule;

means for determining whether the gaze of the user is directed to a portion of the touchscreen display containing an image element without requiring additional user interaction with a user interface;

means for determining a center of the portion of the touchscreen display to which the gaze of the user is directed; and means for enlarging the image element on the touchscreen display based upon a finger size calibration factor related to a size of a finger of the user and a distance from the center of the portion of the touchscreen display to which the gaze of the user is directed in response to determining that the gaze of the user is directed to the portion of the touchscreen display containing the image element.

18. The computing device of claim 17, further comprising means for enlarging a user interface icon when the user interface icon is near the determined location of the gaze of the user on the touchscreen display.

19. The computing device of claim 18, further comprising means for adjusting a mapping of displayed icons to coordinates of the touchscreen display to match the enlarged user interface icon.

20. The computing device of claim 17, wherein:
means for determining whether the gaze of the user is directed to the portion of the touchscreen display containing the image element comprises means for determining whether the gaze of the user is directed to a virtual keyboard image on the touchscreen display; and
means for enlarging the image element on the touchscreen display based upon the finger size calibration factor related to the size of the finger of the user and the distance from the center of the portion of the touchscreen display to which the gaze of the user is directed comprises:
   means for enlarging key icons within the virtual keyboard image located near where the user is looking based upon the finger size calibration factor; and
   means for adjusting a mapping of displayed key icons to coordinates of the touchscreen display to match the enlarged key icons.

21. The computing device of claim 17, further comprising:
means for measuring a dimension of a touch area on the touchscreen display;
means for calculating the finger size calibration factor based upon the measured dimension of the touch area; and
means for storing the calculated finger size calibration factor in the memory.

22. The computing device of claim 17, wherein:
means for determining whether the gaze of the user is directed to the portion of the touchscreen display containing the image element comprises means for determining whether the gaze of the user is directed to a vicinity of displayed hyperlinks; and
means for enlarging the image element on the touchscreen display based upon the finger size calibration factor related to the size of the finger of the user and the distance from the center of the portion of the touchscreen display to which the gaze of the user is directed comprises:
   means for enlarging the displayed hyperlinks located near where the user is looking based upon the finger size calibration factor; and
   means for adjusting a mapping of the displayed hyperlinks to coordinates of the touchscreen display to match the enlarged displayed hyperlinks.

23. The computing device of claim 17, wherein the computing device is a mobile device.

24. The computing device of claim 17, wherein the computing device is a personal computer.

25. A non-transitory processor-readable storage medium having stored thereon processor-executable instructions configured to cause a processor of a computing device to perform operations comprising:
displaying a moving icon on a touchscreen display for a predetermined eye-tracking training period;
obtaining a first plurality of images of eyes of a user of the computing device with a digital camera during the predetermined eye-tracking training period and when the face of the user is at a first distance from the digital camera;
obtaining a second plurality of images of the eyes of the user with the digital camera when the face of the user is at a second distance from the digital camera;
comparing the obtained first plurality of images to known locations of the moving icon during the predetermined eye-tracking training period to determine an image analysis rule;
comparing the obtained second plurality of images to known locations of the moving icon to adjust the image analysis rule;
storing the adjusted image analysis rule in memory;
obtaining a digital image of the eyes of the user of the computing device with the digital camera after the predetermined eye-tracking training period;
determining a location of a gaze of the user based on the obtained digital image and the adjusted image analysis rule;
determining whether the gaze of the user is directed to a portion of the touchscreen display containing an image element without requiring additional user interaction with a user interface;
determining a center of the portion of the touchscreen display to which the gaze of the user is directed; and
enlarging the image element on the touchscreen display based upon a finger size calibration factor related to a size of a finger of the user and a distance from the center of the portion of the touchscreen display to which the gaze of the user is directed in response to determining that the gaze of the user is directed to the portion of the touchscreen display containing the image element.

26. The non-transitory processor-readable storage medium of claim 25, wherein the stored processor-executable instructions are configured to cause the processor to perform operations further comprising enlarging a user interface icon when the user interface icon is near the determined location of the gaze of the user on the touchscreen display.

27. The non-transitory processor-readable storage medium of claim 26, wherein the stored processor-executable instructions are configured to cause the processor to perform operations further comprising adjusting a mapping of displayed icons to coordinates of the touchscreen display to match the enlarged user interface icon.

28. The non-transitory processor-readable storage medium of claim 25, wherein the stored processor-executable instructions are configured to cause the processor to perform operations such that:
determining whether the gaze of the user is directed to the portion of the touchscreen display containing the image element comprises determining whether the gaze of the user is directed to a virtual keyboard image on the touchscreen display; and
enlarging the image element on the touchscreen display based upon the finger size calibration factor related to the size of the finger of the user and the distance from the center of the portion of the touchscreen display to which the gaze of the user is directed comprises:
   enlarging key icons within the virtual keyboard image located near where the user is looking based upon the finger size calibration factor; and
   adjusting a mapping of displayed key icons to coordinates of the touchscreen display to match the enlarged key icons.

29. The non-transitory processor-readable storage medium of claim 25, wherein the stored processor-executable instructions are configured to cause the processor to perform operations further comprising:
measuring a dimension of a touch area on the touchscreen display;
calculating the finger size calibration factor based upon the measured dimension of the touch area; and storing the calculated finger size calibration factor in the memory.

30. The non-transitory processor-readable storage medium of claim 25, wherein the stored processor-executable instructions are configured to cause the processor to perform operations such that:

determining whether the gaze of the user is directed to the portion of the touchscreen display containing the image element comprises determining whether the gaze of the user is directed to a vicinity of displayed hyperlinks; and enlarging the image element on the touchscreen display based upon the finger size calibration factor related to the size of the finger of the user and the distance from the center of the portion of the touchscreen display to which the gaze of the user is directed comprises:
  enlarging the displayed hyperlinks located near where the user is looking based upon the finger size calibration factor; and
  adjusting a mapping of the displayed hyperlinks to coordinates of the touchscreen display to match the enlarged displayed hyperlinks.

31. The non-transitory processor-readable storage medium of claim 25, wherein the stored processor-executable instructions are configured to be executed by a processor of a mobile device.

32. The non-transitory processor-readable storage medium of claim 25, wherein the stored processor-executable instructions are configured to be executed by a processor of a personal computer.

* * * * *